(12) United States Patent
Tripathi et al.

(10) Patent No.: US 8,005,022 B2
(45) Date of Patent: Aug. 23, 2011

(54) HOST OPERATING SYSTEM BYPASS FOR PACKETS DESTINED FOR A VIRTUAL MACHINE

(75) Inventors: Sunay Tripathi, San Jose, CA (US); Tim P. Marsland, Half Moon Bay, CA (US); Nicolas G. Droux, Rio Rancho, NM (US); Kais Belgaied, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1122 days.

(21) Appl. No.: 11/489,943

(22) Filed: Jul. 20, 2006

(65) Prior Publication Data

US 2008/0019365 A1    Jan. 24, 2008

(51) Int. Cl.
*H04L 12/28* (2006.01)
(52) U.S. Cl. ........................................ 370/258
(58) Field of Classification Search ............... 370/463, 370/412, 389, 258
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,006,440 B2 * | 2/2006 | Agrawal et al. | 370/235 |
| 7,046,665 B1 | 5/2006 | Walrand et al. | |
| 7,177,311 B1 | 2/2007 | Hussain et al. | |
| 7,260,102 B2 * | 8/2007 | Mehrvar et al. | 370/412 |
| 7,313,142 B2 | 12/2007 | Matsuo et al. | |
| 7,353,360 B1 * | 4/2008 | Muller et al. | 711/203 |
| 7,478,173 B1 * | 1/2009 | Delco | 709/250 |
| 7,561,531 B2 * | 7/2009 | Lewites et al. | 370/254 |
| 7,715,416 B2 * | 5/2010 | Srinivasan et al. | 370/412 |
| 2003/0037154 A1 | 2/2003 | Poggio et al. | |
| 2005/0135243 A1 | 6/2005 | Lee et al. | |
| 2005/0138620 A1 | 6/2005 | Lewites | |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner* — Derrick W Ferris
*Assistant Examiner* — Mohammad Anwar
(74) *Attorney, Agent, or Firm* — Osha • Liang LLP (57) ABSTRACT

A method for processing packets that includes receiving a first packet for a first virtual machine by a network interface card (NIC), classifying the first packet using a hardware classifier, where the hardware classifier is located on the NIC, sending the first packet to a first one of a plurality of receive rings based on the classification, sending the first packet from the first one of the plurality of receive rings to a first virtual network interface card (VNIC), sending the first packet from the first VNIC to a first interface, and sending the first packet from the first interface to the first virtual machine, where the first virtual machine is associated with the first interface, where the first VNIC and the first virtual machine are executing on a host.

15 Claims, 6 Drawing Sheets

U.S. PATENT DOCUMENTS

2006/0041667 A1  2/2006  Ahn et al.
2006/0070066 A1  3/2006  Grobman
2006/0174324 A1  8/2006  Zur et al.
2007/0244972 A1* 10/2007 Fan ............................... 709/205
2007/0271401 A1* 11/2007 Louzoun et al. .............. 710/264

OTHER PUBLICATIONS

Dovrolis, C., Thayer, B. and Ramanathan, P: "HIP: Hybrid Interrupt—Polling for the Network Interface", ACM SIGOPS Operating Systems Review, vol. 35, Iss. 4, Oct. 2001, (11 Pages).

* cited by examiner

HOST OPERATING SYSTEM BYPASS FOR PACKETS DESTINED FOR A VIRTUAL MACHINE

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. Pat. No. 7,672,299; "Method and System for Controlling Virtual Machine Bandwidth" with U.S. Pat. No. 7,613,132; "Virtual Switch" with U.S. Pat. No. 7,643,482; "System and Method for Virtual Network Interface Cards Based on Internet Protocol Addresses" with U.S. Pat. No. 7,684,423; "Virtual Network Interface Card Loopback Fastpath" with U.S. Pat. No. 7,630,368; "Bridging Network Components" with U.S. Pat. No. 7,634,608; "Reflecting the Bandwidth Assigned to a Virtual Network Interface Card Through Its Link Speed" with U.S. Pat. No. 7,792,140; "Method and Apparatus for Containing a Denial of Service Attack Using Hardware Resources on a Virtual Network Interface Card" with U.S. Pat. No. 7,966,401; "Virtual Network Interface Cards with VLAN Functionality" with U.S. Pat. No. 7,742,474; "Method and Apparatus for Dynamic Assignment of Network Interface Card Resources" with U.S. Pat. No. 7,613,198; "Generalized Serialization Queue Framework for Protocol Processing" with U.S. Pat. No. 7,715,416; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. Pat. No. 7,836,212; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Multi-Level Packet Classification" with U.S. Pat. No. 7,848,331; "Method and System for Automatically Reflecting Hardware Resource Allocation Modifications" with U.S. Pat. No. 7,788,411; "Multiple Virtual Network Stack Instances Using Virtual Network Interface Cards" with U.S. Pat. No. 7,788,257; "Method and System for Network Configuration for Containers" with U.S. Pat. No. 7,912,926; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. Pat. No. 7,894,453; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for processing packets. The method comprises receiving a first packet for a first virtual machine by a network interface card (NIC), classifying the first packet using a hardware classifier, wherein the hardware classifier is located on the NIC, sending the first packet to a first one of a plurality of receive rings based on the classification, sending the first packet from the first one of the plurality of receive rings to a first virtual network interface card (VNIC), sending the first packet from the first VNIC to a first interface, and sending the first packet from the first interface to the first virtual machine, wherein the first virtual machine is associated with the first interface, wherein the first VNIC and the first virtual machine are executing on a host.

In general, in one aspect, the invention relates to a method for processing a packet. The method comprises registering a first network interface card (NIC) with a host, querying the first NIC, by a first device driver associated with the first NIC, to obtain first hardware information associated with the first NIC, registering a second NIC with the host, querying the second NIC, by a second device driver associated with the second NIC, to obtain second hardware information associated with the second NIC, receiving the packet for a virtual machine by the first NIC, classifying the packet using a hardware classifier, wherein the hardware classifier is located on the first NIC, sending the packet to one of a plurality of receive rings based on the classification, wherein the one of the plurality of receive rings is located on the first NIC, sending the packet from the one of the plurality of receive rings to a virtual network interface card (VNIC), sending the packet from the VNIC to an interface, and sending the packet from the interface to the virtual machine associated with the interface, wherein the first hardware information is advertised by the first device driver in a first format, wherein the second hardware information is advertised by the second device driver in a second format, and wherein the first format is the same as the second format.

In general, in one aspect, the invention relates to a system. The system comprises a first network interface card (NIC) comprising a first plurality of receive rings and a first hardware classifier, wherein the first NIC is configured to receive a first packet for a first virtual machine, classify the first packet using the first hardware classifier, and send the first packet to a first one of a first plurality of receive rings based on the classification, and a host, operatively connected to the first NIC, comprising a first virtual network interface card (VNIC), a first interface, operatively connected to the first VNIC, the first virtual machine, operatively connected to the first interface, wherein the host is configured to obtain the first packet from the first one of the first plurality of receive rings, send the first packet to the first VNIC, send the first packet from the first VNIC to the first interface, and send the first packet from the first interface to the first virtual machine.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for programming a classifier (hardware or software) to route packets to a virtual machine. In one embodiment of the invention, the aforementioned routing allows the packets to be forwarded to the virtual machine without the host having to determine to which virtual machine to send the packets. Said another way, embodiments of the invention off-load the classification of the packets from an application residing on the host to network interface card (NIC) hardware or a Media Access Control (MAC) level component in the host.

In addition, embodiments of the invention provide a mechanism for discovering NICs and obtaining the hardware information associated with the NICs. In general, the hardware information corresponds to information about various hardware resources (e.g., receive rings, transmit rings, hardware classifier functionality) as well as information about the various control functions that may be used to control the aforementioned hardware resources.

Figure 1:
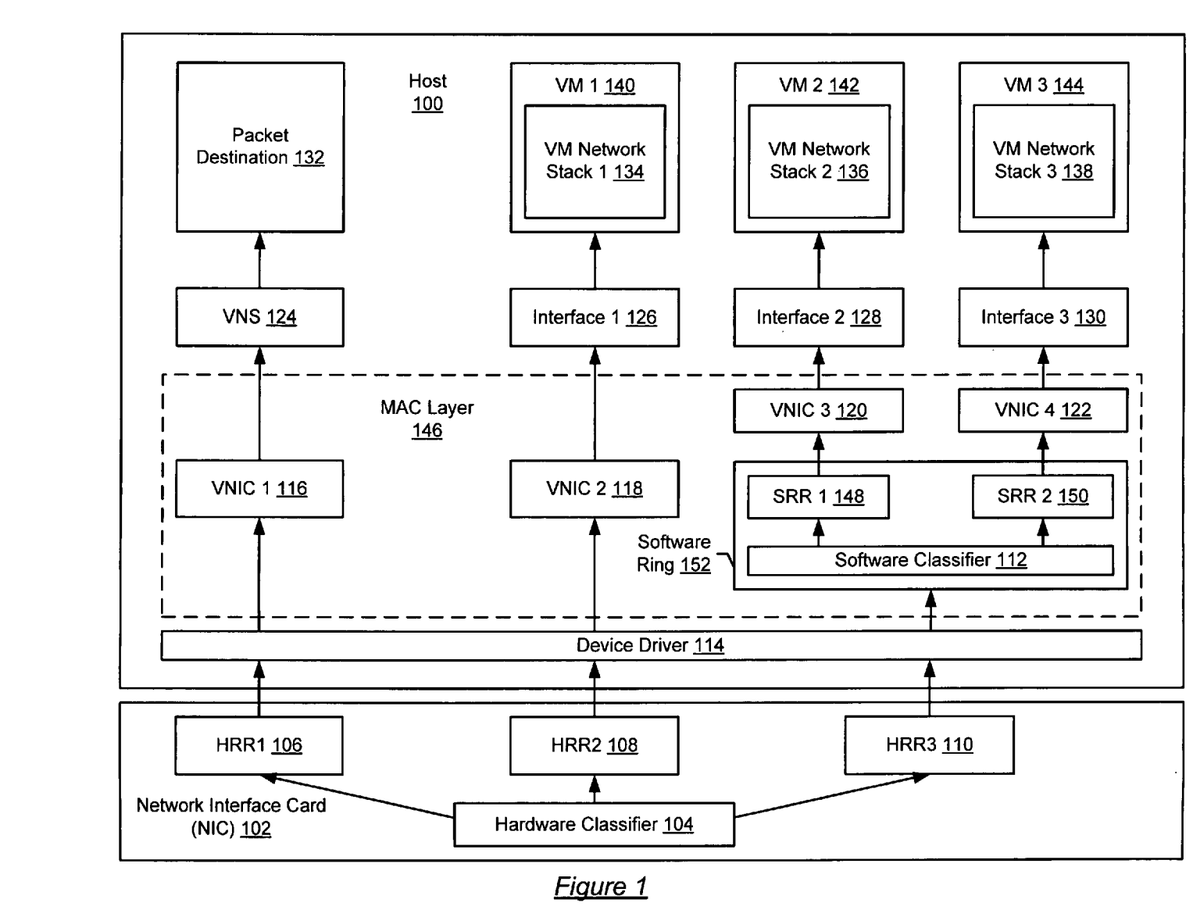
FIG. 1 shows a system in accordance with one embodiment of the invention.

FIG. 1 shows a system in accordance with one embodiment of the invention. As shown in FIG. 1, the system includes a host (100) operatively connected to a network interface card (NIC) (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network) (not shown). For example, the NI may correspond to an RJ-45 connector, a wireless antenna, etc. The packets received by the NI are then sent to other components on the NIC (102) for processing. In one embodiment of the invention, the NIC (102) includes a hardware classifier (104) and one or more hardware receive rings (HRRs) (106, 108, 110). In one embodiment of the invention, the HRRs (106, 108, 110) correspond to portions of memory within the NIC (102) used to temporarily store the received packets.

In one embodiment of the invention, the hardware classifier (104) is configured to analyze the incoming network traffic, typically in the form of packets, received from the network (not shown). In one embodiment of the invention, analyzing individual packets includes determining to which of the HRRs (106, 108, 110) each packet is sent. In one embodiment of the invention, analyzing the packets by the hardware classifier (104) includes analyzing one or more fields in each of the packets to determine to which of the HRRs (106, 108, 110) the packets are sent. As an alternative, the hardware classifier (104) may use the contents of one or more fields in each packet as an index into a data structure that includes information necessary to determine to which HRR (106, 108, 110) that packet is sent.

The hardware classifier (104) may be implemented entirely in hardware (i.e., the hardware classifier (104) may be a separate microprocessor embedded on the NIC (102)). Alternatively, the hardware classifier (104) may be implemented in software stored in memory (e.g., firmware, etc.) on the NIC (102) and executed by a microprocessor on the NIC (102).

In one embodiment of the invention, the host (100) may include the following components: a device driver (114), a software ring (152), one or more virtual network interface cards (VNICs) (116, 118, 120, 122), one or more virtual network stacks (VNSs) (124), one or more packet destinations (132), one or more interfaces (126, 128, 130), and one or more virtual machines (140, 142, 144). Each of the aforementioned components is described below.

In one embodiment of the invention, the device driver (114) provides an interface between the HRRs (106, 108, 110) and the host (100). More specifically, the device driver (114) exposes the HRRs (106, 108, 110) to the host (100) such that the host (100) (or, more specifically, a process executing on the host) (100) may obtain packets from the HRRs (106, 108, 110).

In one embodiment of the invention, the software ring (152) includes a software classifier (112) and a number of software receive rings (SRR) (e.g., 148, 150). In one embodiment of the invention, the software classifier (152) has the same functionality as the hardware classifier (104). However, instead of sending the classified packets to a HRR (106, 108, 110), the software classifier (112) forwards classified packets to one of the SRRs (148, 150). The SRRs (148, 150) are configured to temporarily store the received packets after being classified by the software classifier (112). In one embodiment of the invention, the software ring (152) resides in a Media Access Control (MAC) layer (146) of the host (100).

In one embodiment of the invention, each of the VNICs (116, 118, 120, 122) is associated with either a SRR (148, 150) or a HRR (106, 108, 110). The VNICs (116, 118, 120, 122) provide an abstraction layer between the NIC (102) and the various packet destinations (132) or virtual machines (140, 142, 144) executing on the host (100). More specifically, each VNIC (116, 118, 120, 122) operates like a NIC (102). For example, in one embodiment of the invention, each VNIC (116, 118, 120, 122) is associated with one or more Internet Protocol (IP) addresses, one or more Media Access Control (MAC) addresses, optionally, one or more ports, and, is optionally configured to handle one or more protocol types. Thus, while the host (100) may be operatively connected to a single NIC (102), packet destinations (132) and virtual machines (140, 142, 144) executing on the host (100)) operate as if the host (100) is bound to multiple NICs. In one embodiment of the invention, the VNICs (116, 118, 120, 122) reside in a Media Access Control (MAC) layer of the host (100).

Each of the VNICs (116, 118, 120, 122) is operatively connected to a corresponding VNS (124). In one embodiment of the invention, each VNS (124) includes functionality to process packets in accordance with various protocols used to send and receive packets (e.g., Transmission Communication Protocol (TCP), Internet Protocol (IP), User Datagram Protocol (UDP), etc.). Further, each VNS (124) may also include functionality, as needed, to perform additional processing on the incoming and outgoing packets. This additional processing may include, but is not limited to, cryptographic processing, firewall routing, etc.

In one embodiment of the invention, each VNS (124) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). The structure and functionality of the VNSs (124) is discussed in FIG. 2.

As discussed above, the host (100) includes one or more packet destinations (132). In one embodiment of the invention, the packet destination(s) (132) corresponds to any process (or group of processes) executing on the host that is configured to send and/or receive network traffic. Further, the packet destination(s) (132) does not include an internal network stack (i.e., there is no network stack within the packet destination); rather, the packet destination (132) is associated with a VNS (124).

Examples of packet destinations (132) include, but are not limited to containers, services (e.g., web server), etc. As shown in FIG. 1, the VNS (124) is associated with a packet destination (132). In one embodiment of the invention, each packet destination is associated with a single VNS (124). Alternatively, each packet destination is associated with one or more VNSs (124).

In one embodiment of the invention, each VNS (124) is associated with a bandwidth allocation. Those skilled in the art will appreciate that if there is only one VNS (124) bound to the packet destination (132), then the bandwidth allocation of the VNS (124) corresponds to the bandwidth allocated to the packet destination (132). In one embodiment of the invention, the bandwidth allocation corresponds to the number of packets the packet destination may receive in a given time interval (e.g., megabytes per seconds). The bandwidth allocation for a given packet destination is enforced by the VNS operating in polling mode (discussed in FIG. 5).

In one embodiment of the invention, the VNIC (116, 118, 120, 122) may be bound to a virtual machine (140, 142, 144) (e.g., Xen Domain) instead of a packet destination (132). In such cases, the VNIC is bound to an interface (126, 128, 130) (e.g., a Xen interface), where the interface enables the VNIC to communicate to with the virtual machine. In one embodiment of the invention, each of the aforementioned virtual machines includes its own network stack (e.g., 134, 136, 138) and includes its own operating system (OS) instance, which may be different than the OS executing on the host. In one embodiment of the invention, each virtual machine (140, 142, 144) is associated with its own MAC address and IP address (which may be static or obtained using Dynamic Host Configuration Protocol (DHCP)). Further, the VNIC associated with the virtual machine (e.g., VNIC 2 (118) is associated with VM 1 (140) in FIG. 1) includes the same MAC address and IP address as virtual machine with which it is associated.

Figure 2:
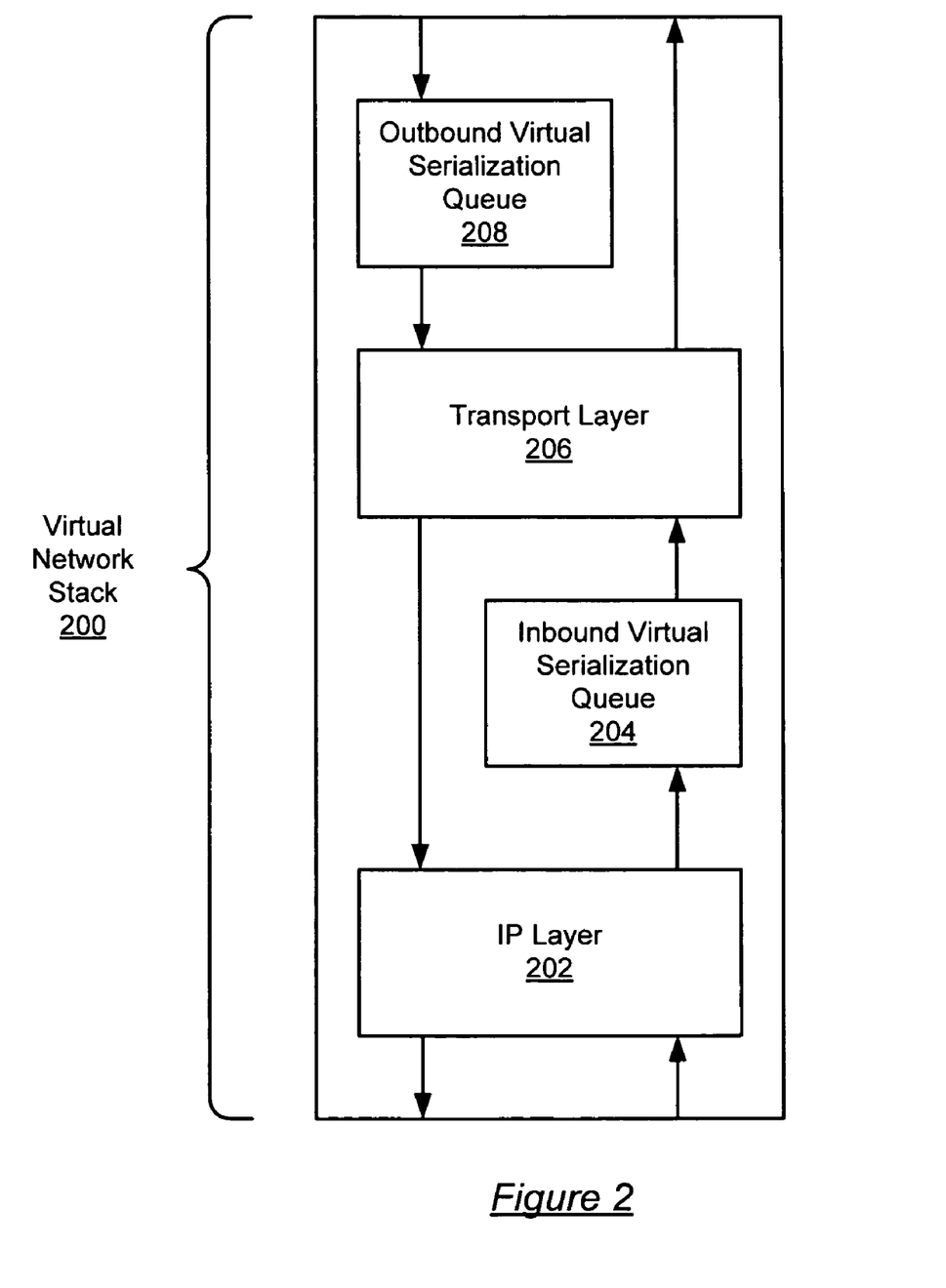
FIG. 2 shows a virtual network stack in accordance with one embodiment of the invention.

FIG. 2 shows a virtual network stack (VNS) in accordance with one embodiment of the invention. In one embodiment of the invention, the VNS (200) includes an Internet Protocol (IP) layer (202), an inbound virtual serialization queue (VSQ) (204), a transport layer (206), and an outbound virtual serialization queue (208). Each of the aforementioned components is discussed below.

In one embodiment, the IP layer (202) is configured to receive packets from the VNIC associated with the VNS (200) (e.g., VNS (124) receives packets from VNIC 1 (116) in FIG. 1). Further, the IP layer (202) is configured to receive packets from the transport layer (206). In one embodiment of the invention, the IP layer (202) is configured to perform IP level processing for both inbound and outbound packets.

Continuing with the discussion of FIG. 2, the inbound VSQ (204) is configured to receive packets from the IP layer (202). The inbound VSQ (204) corresponds to a queue data structure and is configured to queue packets received from the IP layer (202) prior to the packets being processed by the transport layer (206). In one embodiment of the invention, the inbound VSQ (204) may be used to control the number of packets being received by the packet destination (e.g., 132) associated with the VNS. The inbound VSQ (204) may control the bandwidth by limiting the number of packets in the VSQ (204) and preventing additional packets from entering the VNS (200) until the inbound VSQ (204) has less than a threshold number of packets.

In one embodiment of the invention, the transport layer (206) is configured to process inbound and outbound packets in accordance with Transmission Control Protocol (TCP), User Datagram Protocol (UDP), or both UDP and TCP. Other protocols may be supported by the transport layer (206).

In one embodiment of the invention, the outbound VSQ (208) is a queue data structure configured to receive packets from the packet destination (e.g., 132) with which the VNS (200) is associated. Further, the outbound VSQ (208) is configured to store packets prior to sending the received packets to the transport layer (206). In one embodiment of the invention, the outbound VSQ (208) is also configured to control the flow of packets from the packet destination (e.g., 132) associated with the VNS (200) to the VNS (200). In one embodiment of the invention, the outbound VSQ (208) (or a related process) is configured to block an application from sending packets to the outbound VSQ (208), if the packet destination (e.g., 132) is attempting to issue packets at a higher rate than the outbound bandwidth allocated to the packet destination (e.g., 132). Further, the outbound VSQ (208) (or a related process) is configured to notify the packet destination (e.g., 132) when it is no longer blocked from issuing packets to the VNS (200).

In one embodiment of the invention, the inbound VSQ (204) and outbound VSQ (208) are each configured to enforce the manner in which packets are processed. Specifically, the inbound VSQ (204) and outbound VSQ (208) may be configured to enforce the packet processing requirements imposed by the transport layer (206). For example, TCP requires serial processing of packets. Thus, the inbound VSQ (204) and outbound VSQ (208) may require all threads accessing the inbound VSQ (204) and outbound VSQ (208) to conform to a mutual exclusion policy. In one embodiment of the invention, the mutual exclusion policy requires that only one thread may access the VSQ (inbound or outbound) at a time. Thus, if two threads are attempting to access a given VSQ (inbound or outbound), one thread must wait until the other thread has finished accessing the VSQ (inbound or outbound).

Alternatively, if the transport layer (206) only supports UDP, then the inbound VSQ (204) and outbound VSQ (208) may be configured to allow concurrent access. Said another way, two or more threads may concurrently access the VSQ (inbound or outbound). In one embodiment of the invention, if the transport layer (206) is configured to process both TCP and UDP packets, then the inbound VSQ (204) and outbound VSQ (208) are configured to conform to the more stringent standard (e.g., TCP if the transport layer supports both TCP and UDP).

In one embodiment of the invention, the inbound VSQ (204) and the outbound VSQ (208) are implemented as a single bi-directional VSQ. In such cases, the bi-directional VSQ includes a single set of configuration parameters (discussed above) to enforce the manner in which packets are processed. Further, the enforcement of the configuration parameters is performed on a VSQ-basis (as opposed to a per-direction basis). For example, if the bi-directional VSQ enforces a mutual exclusion policy, then only one thread may access the bi-directional VSQ at a time.

Figure 3:
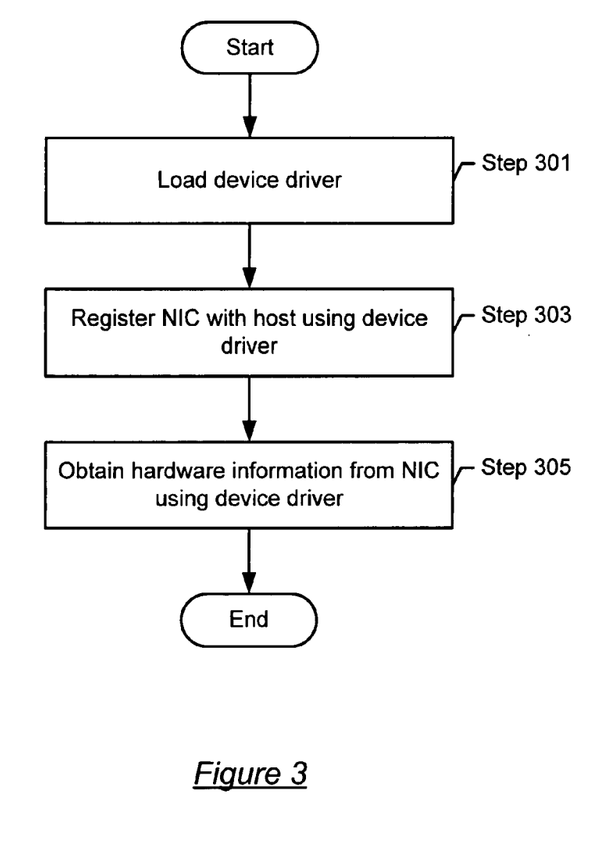
FIGS. 3-5 show flow charts in accordance with one or more embodiments of the invention.

FIG. 3 shows a flow chart in accordance with one embodiment of the invention. More specifically, FIG. 3 shows a method for obtaining hardware information from a network interface card (NIC). Initially, a device driver is loaded on to the host (Step 301). In one embodiment of the invention, the device driver is specific to the NIC. Further, the device driver includes functionality to expose the NIC to the host. Exposing the NIC to the host includes, but is not limited to, obtaining hardware information from the NIC. In one embodiment of the invention, the device driver is interposed between the NIC and MAC layer of the host.

Continuing with the discussion of FIG. 3, the device driver subsequently discovers the NIC and then registers the NIC with the host (Step 303). Registering the NIC with the host may include, but is not limited to, notifying the host that the NIC is operatively connected to the host and that the host (or processes executing on the host) may use the NIC to send and receive packets. At this stage, the host is aware that the NIC is operatively connected to the host but, typically, does not have sufficient information about the various hardware resources within the NIC (i.e., hardware classifier in the NIC) or sufficient information to program the NIC.

The device driver subsequently obtains hardware information from the NIC (Step 305). In one embodiment of the invention, hardware information corresponds to information about the hardware resources on the NIC. The hardware resources may include, but are not limited to, hardware receive rings (HRRs) (e.g., 106 in FIG. 1), transmit receive rings (TRRs) (not shown in FIG. 1), and a hardware classifier (e.g., 104 in FIG. 1). The TRRs correspond to outbound queues (typically First-In-First-Out (FIFO) queues) in the NIC used to handle outbound packets (i.e., packets received from the host and destined for another host on the network). In one embodiment of the invention, the device driver may obtain a listing of all HRRs and TRRs available on the NIC.

In one embodiment of the invention, the hardware information may also include information about various control functions (and related information) used to control the aforementioned hardware resources on the NIC. The following is a non-exhaustive list of control functions (and related information) which may be obtained from the NIC: (i) a listing of the properties of each of the HRRs and TRRs on the NIC (the properties may includes information about the maximum number of packets each of the HRRs and TRRs may store); (ii) a function entry point for each of the HRRs, where the function entry point is used to individually poll (discussed below) each of the HRRs; (iii) an interrupt control function for each of the HRRs, where the interrupt control functions allow Interrupt Mode (discussed below) to be enabled or disabled on a per-HRR basis; (iv) a message signaled interrupt (MSI) control function for each of the HRRs, where the MSI control function provides information about the level of MSI available for each HRR as well as functionality to assign an HRR to a specific MSI; and (v) a control function to program the hardware classifier.

In one embodiment of the invention, the control function to program the hardware classifier corresponds to one or more application programming interfaces (APIs) used to program the hardware classifier to forward packets for specific virtual machines and/or packet destinations to specific HRRs. The aforementioned API is typically used by the host to program the classifier.

In one embodiment of the invention, the hardware information is advertised by the device driver to the host. Further, the hardware information is supplied to the device driver in a standardized format. Thus, the hardware information for two distinct NICs is advertised to the host in the same format (though the content is different). Further, in one embodiment of the invention, the host expects the hardware information in the standardized format.

In one embodiment of the invention, the standardized format specifies the order in which hardware resources within the hardware information are advertised to the host. For example, the standardized format may require that the hardware information is advertised in the following order: (i) HRRs; (ii) TRRs; and (iii) hardware classifier. Further, for each of the aforementioned hardware resources, the standardized format may require certain pieces of information provided in a specific format. For example, the standardized format may require the following information for each HRR: (i) a function entry point; (ii) an interrupt control function to enable or disable interrupt mode for the HRR; and (iii) level of MSI available.

In one embodiment of the invention, the host maintains a copy of the hardware information obtained from each NIC operatively connected to the host.

Figure 4:
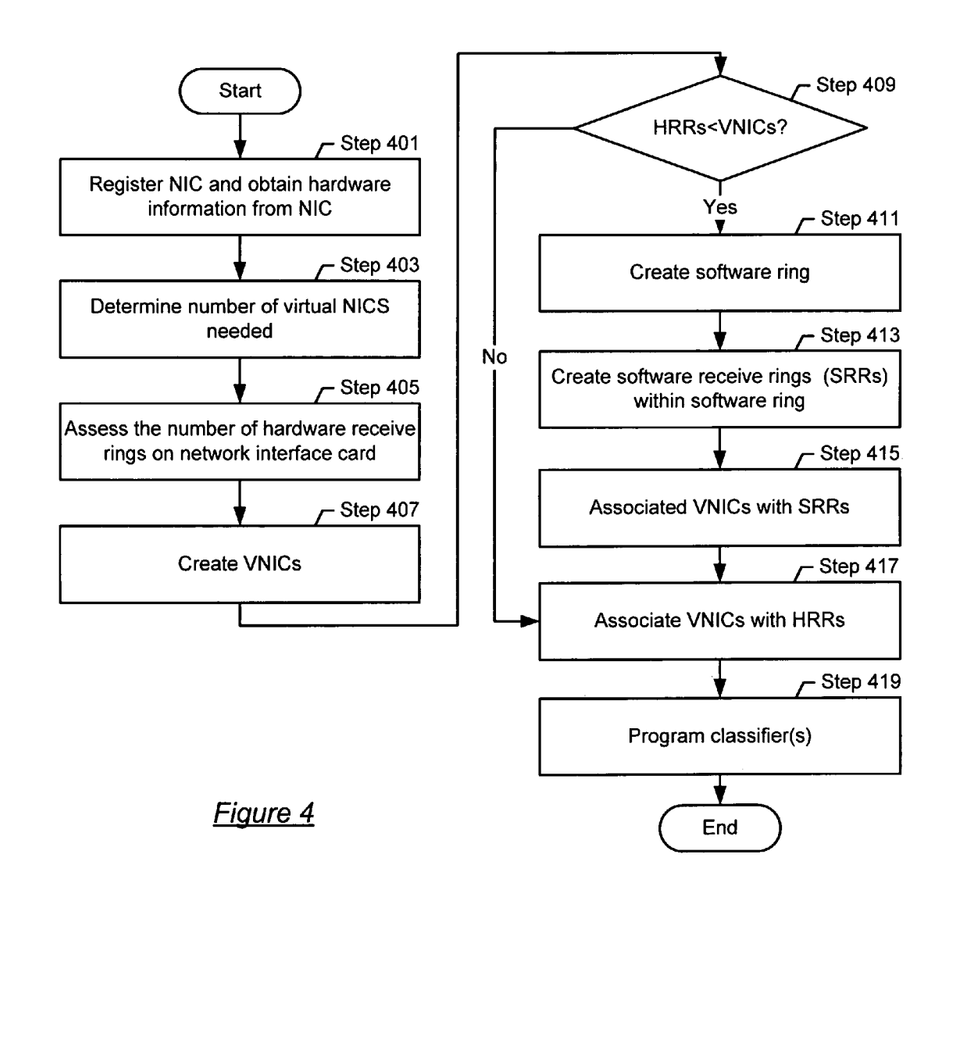

FIG. 4 shows a flow chart in accordance with one or more embodiments of the invention. Initially, the NIC is registered and the appropriate device driver is used to obtain hardware information about the network interface card (NIC) (Step 401). Step 401 typically includes performing the steps in FIG. 3. Once Step 401 is completed, a determination is made regarding the number of VNICs that need to be created on the host (Step 403). In one or more embodiments of the invention, the number of VNICs required corresponds to the number of packet destinations on the host.

Once the number of VNICs to be created has been determined, the number of hardware receive rings on the NIC is assessed (Step 405). VNICs are subsequently created in the host, where the number of VNICs created corresponds to the number of VNICs determined in Step 403 (Step 407). Next, a determination is made about whether there are fewer HRRs than VNICs on the host (Step 409). If there are fewer HRRs than VNICs on the host, then a software ring is created in the host and subsequently associated with one of the HRRs (Step 411).

A set of software receive rings (SRRs) is then created within the software ring (Step 413). The VNICs are then bound to the SRRs (Step 415). More specifically, the VNICs that cannot be bound to the HRRs are bound to the SRRs. Then, the remaining VNICs are bound to the HRRs (Step 417). The hardware classifier (in the NIC) and the software classifier (if host includes a software ring) are programmed (Step 419). In one embodiment of the invention, programming the hardware classifier and software classifier includes specifying to which HRR or SRR to send the received packets. The hardware classifier may be programmed using an API advertised by the device driver (see FIG. 3 above). Those skilled in the art will appreciate that steps in FIG. 4 may be a different order.

In one embodiment of the invention, programming the hardware classifier includes specifying that all packets for a specific packet destination or virtual machine are sent to a specific HRR. In one embodiment of the invention, the hardware classifier is programmed using the MAC address and, optionally, the IP address associated with the virtual machines. Thus, all packets with a specific MAC address (and optionally an IP address) are sent to a specific HRR. As discussed, the HRRs are bound to VNICs or software rings. Thus, packets sent to specific HRRs are subsequently sent to the appropriate VNIC or software ring.

In the case where the packets are sent to the software ring, the software classifier in the software ring performs additional classification. In one embodiment of the invention, the software classifier includes the same functionality as the hardware classifier and is programmed using the same criteria (e.g., MAC addresses, IP addresses, etc.) as the hardware classifier.

In one embodiment of the invention, VNICs are preferably bound to an HRR if an HRR is available and the hardware classifier in the NIC is configured to perform the level of classification required by the host. In such cases, one HRR is bound to a software ring and the other HRRs are bound to VNICs. In one embodiment of the invention, each of the aforementioned VNICs is associated with a virtual network stack (VNS). Further, each VNS is associated with a bandwidth allocation.

As stated above, software rings can be arbitrarily created on top of HRR or SRRs. As a result, different structures involving software rings can be created to handle the same number of VNICs using the method shown in FIG. 4.

Figure 5:
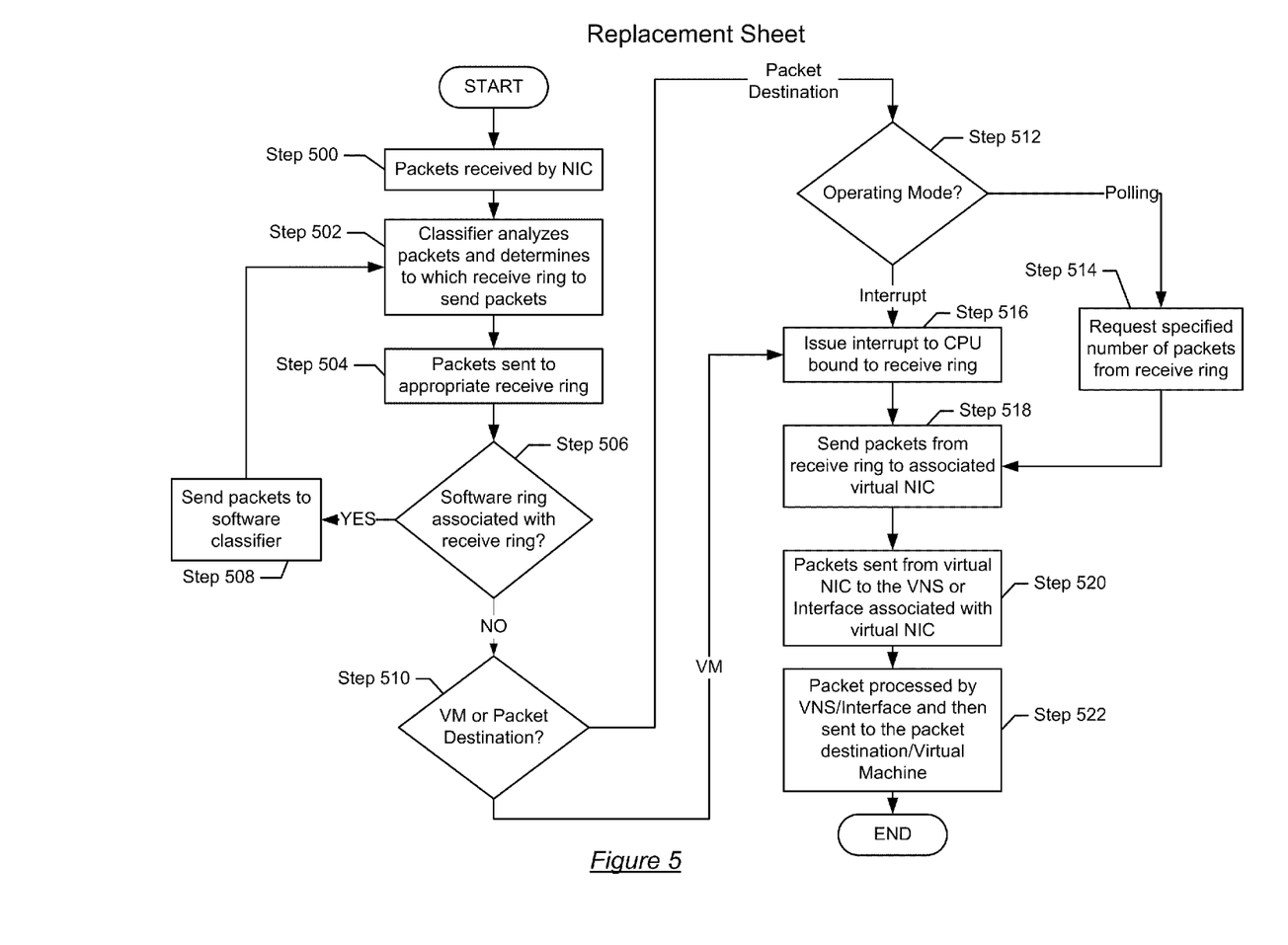

FIG. 5 shows a flow chart in accordance with one or more embodiments of the invention. Initially, a packet is received by a NIC (Step 500). Next, a hardware classifier associated with the NIC determines to which receive ring (e.g., HRR) on the NIC to send the packets (Step 502). The packets are then sent to the appropriate receive ring (Step 504) based on the classification.

A determination is then made about whether the receive ring is associated with a software ring (Step 506). In one embodiment of the invention, the receive ring is associated with the software ring if packets from the receive ring are sent from the receive ring to the software ring. If the receive ring is associated with a software ring, then the packets are forwarded to a software classifier in the software ring (Step 508). The process then proceeds to Step 502. If Step 502 is entered from Step 508, then classifier in Step 502 now corresponds to a software classifier and all references to receive rings in Steps 502-520 correspond to SRRs. Said another way, when Steps 502-506 are initially performed, the classifier corresponds a hardware classifier and the receive rings correspond to HRRs. However, if the HRR is bound to a software ring (see Step 506), then in all subsequent executions of Steps 502-520, the classifier corresponds to a software classifier and all references to receive rings in Steps 502-520 correspond to SRRs.

If the receive ring is not associated with a software ring, then a determination is made about whether the receive ring (HRR or SRR) is associated with a virtual machine or a packet destination (Step 510). The receive ring is associated with the virtual machine if the receive ring sends (via a VNIC)

received packets to an interface, which in turn sends packets to a virtual machine. Similarly, the receive ring is associated with a packet destination if the receive ring (via a VNIC) sends packets to a VNS, which in turn sends packets to a packet destination.

If the receive ring is associated with a packet destination, the process proceeds to Step 512. Alternatively, if the receive ring is associated with a virtual machine, then the process proceeds to Step 516. With respect to Step 512, a determination is made about whether the VSQ associated with the VNS is operating in polling mode or interrupt mode.

If the VSQ is operating in polling mode, then the packets remain in the receive ring (HRR or SRR) until the VSQ requests a specified number of packets from the receive ring (Step 514). In one embodiment of the invention, the VSQ does not request any packets when there are packets already queued on the VSQ. In one or more embodiments of the invention, the VSQ retrieves all packets from the receive ring when a request is made for packets.

Those skilled in the art will appreciate that the receive rings store a finite number of packets. Thus, if the receive rings receive packets at a faster rate than the rate at which the corresponding VSQ requests the packets, the receive rings will eventually fill completely with packets and packets received after this point are dropped until packets on the receive rings are requested and processed. In one embodiment of the invention, the rate at which packets are requested from the receive ring (SRR or HRR) and the number of packets requested are determined by the bandwidth allocation of the VNS bound to the receive ring. In one embodiment of the invention, a function entry point associated with the receive ring is used to poll the specific receive ring (HRR or SRR).

Alternatively, if the VSQ is operating in interrupt mode or the VNIC is associated with a virtual machine, then an interrupt is issued to a processor (i.e., a processor bound to the VSQ that is bound to the VNS associated with the receive ring or to a processor bound to a virtual machine) (Step 516). In one embodiment of the invention, if the receive ring is an SRR and it is bound to a VNIC, then the interrupt (as recited in Step 516) is a software interrupt as opposed to a hardware interrupt (as recited in Step 516), which is generated when the HRR is bound to a VNIC. The packets are then sent to the VNIC (Step 518). In one embodiment of the invention, if the VSQ is operating polling mode, then the VSQ, which includes the function entry point, uses the function entry point to obtain the packet from the receive ring and place it in the appropriate VNIC. Alternatively, if the VSQ is operating in interrupt mode, then the device driver (or NIC) executes the function entry point to send the packet from the receive ring to the appropriate VNIC.

The VNIC subsequently forwards the packets to the appropriate VNS or Interface (Step 520), where the packets are processed and then sent to the packet destination or virtual machine (Step 522). In one embodiment of the invention, processing the packet by the interface includes flipping the content of the packet such that the most significant bit becomes the least significant bit. Once the packet has been processed by the interface, it is placed in the address space associated with the virtual machine. In one embodiment of the invention, processing the packet by the VNS is described in FIG. 2.

In one embodiment of the invention, the method shown in FIG. 5 allows packets for the virtual machines to be sent to the appropriate virtual machine without requiring the host operating system to perform any additional classification. The functionality to send the packets to the appropriate virtual machine is enabled by the ability to program the hardware classifier to direct packets for a specific virtual machine to a specific HRR.

As discussed above, in some cases, there may not be a sufficient number of HRRs to allow each virtual machine to be mapped to a unique HRR. In such cases, the packets for a number of virtual machines are sent to a specific HRR. Packets from the specific HRR are then sent to a software ring, where the software ring performs additional classification and sends the packets to the appropriate SRR. The SRRs subsequently send packets (using interrupt or polling mode) to the appropriate VNICs, which in turn forward packets towards the appropriate packet destination or virtual machine.

Figure 6:
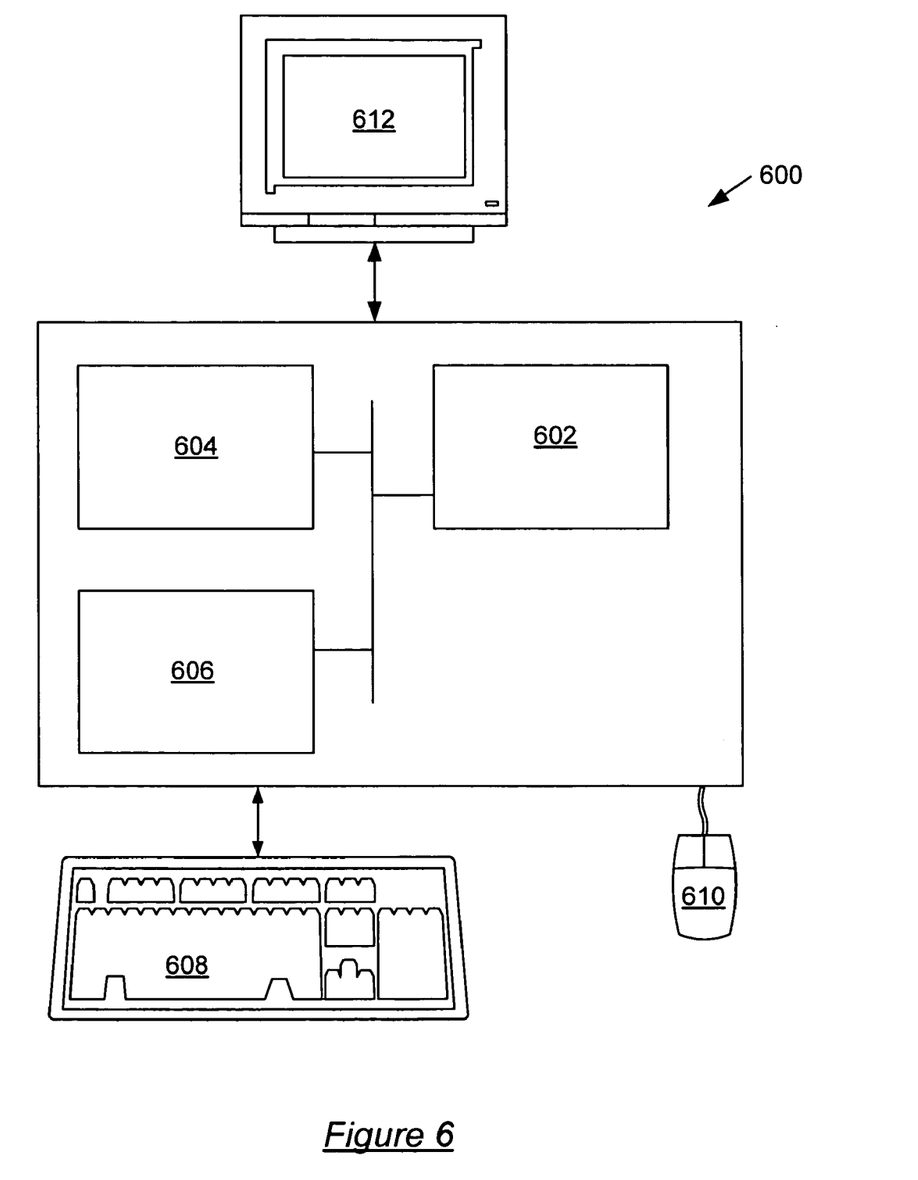
FIG. 6 shows a computer in accordance with one embodiment of the invention.

An embodiment of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions which, when executed by a processor, perform a method for processing packets, the method comprising:
   registering a physical network interface card (NIC) with a host;
   querying the NIC, by a device driver associated with the NIC, to obtain hardware information associated with the NIC, wherein the hardware information comprises:
      a first function entry point associated with a first receive ring; and
      at least one selected from a group consisting of an interrupt control function to control each of the plurality of receive rings individually, a message signaled interrupt (MSI) control function for each of the plurality of receive rings, and a control function to program the hardware classifier;
   receiving a first packet for a first virtual machine by the NIC, wherein the first packet is classified using a hardware classifier located on the NIC, and wherein the first packet is sent to a first receive ring of a plurality of receive rings based on the classification;
   receiving the first packet from the first one of the plurality of receive rings by a first virtual network interface card (VNIC) executing on the host, wherein the first VNIC is located in a Media Access Control (MAC) layer of the host, wherein the first packet is sent directly from the first receive ring to the first VNIC using the first function entry point;

sending the first packet directly from the first VNIC to a first interface; and sending the first packet from the first interface to the first virtual machine, wherein the first virtual machine is associated with the first interface, wherein the first virtual machine is executing on the host.

2. The non-transitory computer readable medium of claim 1, wherein the hardware information further comprises a listing of the plurality of receive rings in the NIC.

3. The non-transitory computer readable medium of claim 2, wherein a copy of the hardware information associated with the NIC is stored on the host.

4. The non-transitory computer readable medium of claim 1, wherein querying the NIC, by the device driver associated with the NIC, comprises a request to obtain an Application Programming Interface (API) for programming the hardware classifier.

5. The non-transitory computer readable medium of claim 1, the method further comprising:

receiving a second packet for a second virtual machine by the NIC;

classifying the second packet using the hardware classifier;

sending the second packet to a second receive ring of the plurality of receive rings based on the classification;

sending, using a second function entry point, the second packet from the second receive ring directly to a second VNIC, wherein the second VNIC is located in the Media Access Control (MAC) layer of the host;

sending the second packet from the second VNIC to a second interface; and sending the second packet from the second interface to the second virtual machine, wherein the second virtual machine is associated with the second interface, wherein the second VNIC and the second virtual machine are executing on the host.

6. A method for processing a packet, comprising:

registering a first physical network interface card (NIC) with a host;

querying the first NIC, by a first device driver associated with the first NIC, to obtain first hardware information associated with the first NIC, wherein the first hardware information comprises:

a first function entry point associated with a first receive ring of a first plurality of receive rings on the first NIC; and at least one selected from a group consisting of an interrupt control function to control each of the plurality of receive rings individually, a message signaled interrupt (MSI) control function for each of the plurality of receive rings, and a control function to program the hardware classifier;

registering a second NIC with the host;

querying the second NIC, by a second device driver associated with the second NIC, to obtain second hardware information associated with the second NIC, wherein the second hardware information comprises a second function entry point associated with a second receive ring of a second plurality of receive rings on the second NIC;

receiving the packet for a virtual machine by the first NIC;

classifying the packet using a hardware classifier, wherein the hardware classifier is located on the first NIC;

sending the packet to the first receive ring based on the classification, wherein the first receive ring is located on the first NIC;

sending, using the first function entry point, the packet from the first receive ring directly to a first virtual network interface card (VNIC), wherein the VNIC is located in a Media Access Control (MAC) layer of the host;

sending the packet from the first VNIC to an interface; and sending the packet from the interface to the virtual machine associated with the interface, wherein the first hardware information is advertised by the first device driver in a first format, wherein the second hardware information is advertised by the second device driver in a second format, and wherein the first format is the same as the second format.

7. The method of claim 6, wherein a copy of the first hardware information is stored on the host.

8. The method of claim 6, wherein the first hardware information further comprises a listing of the first plurality of receive rings in the first NIC.

9. The method of claim 6, wherein sending the packet to the first receive ring based on the classification comprising using one selected from a group consisting of a polling mode and an interrupt mode.

10. The method of claim 6, further comprising:

receiving, by the second NIC, a subsequent packet for a packet destination on the host;

sending the subsequent packet to the second receive ring;

sending, using the second function entry point, the subsequent packet from the second receive ring directly to a second VNIC;

sending the subsequent packet from the second VNIC to a virtual network stack; and sending the subsequent packet from the virtual network stack to the packet destination.

11. A system, comprising:

a first physical network interface card (NIC) comprising:

a first plurality of receive rings and a hardware classifier, wherein the first NIC is configured to:

receive a first packet for a first virtual machine, classify the first packet using the hardware classifier, and send the first packet to a first receive ring of the first plurality of receive rings based on the classification; and a host, operatively connected to the first NIC, comprising:

a first device driver configured to:

register the first NIC with the host; and query the first NIC to obtain first hardware information associated with the first NIC, wherein the first hardware information comprises:

a first function entry point associated with a first receive ring; and at least one selected from a group consisting of an interrupt control function to control each of the plurality of receive rings individually, a message signaled interrupt (MSI) control function for each of the plurality of receive rings, and a control function to program the hardware classifier;

a first virtual network interface card (VNIC), wherein the first VNIC is located in a Media Access Control (MAC) layer of the host;

a first interface, operatively connected to the first VNIC;

the first virtual machine, operatively connected to the first interface, wherein the host is configured to:
  obtain the first packet from the first receive ring;
  send the first packet directly to the first VNIC using the first function entry point; send the first packet from the first VNIC to the first interface; and
  send the first packet from the first interface to the first virtual machine.

12. The system of claim 11, wherein the first hardware information further comprises a listing of the first plurality of receive rings in the NIC.

13. The system of claim 11, wherein a copy of the first hardware information associated with the first NIC is stored on the host.

14. The system of claim 11, further comprising:
  a second NIC, wherein the second NIC is associated with second hardware information, wherein the second hardware information comprises a second function entry point associated with a second receive ring of a second plurality of receive rings;
  the host further comprising:
    a second device driver, wherein the second device driver is configured to:
      register the second NIC with the host; and
      query the second NIC to obtain the second hardware information,
    wherein the first hardware information is advertised by the first device driver to the host in a first format,
    wherein the second hardware information is advertised by the second device driver to the host in a second format, and
    wherein the first format is the same as the second format.

15. The system of claim 11, wherein the host further comprises:
  a second VNIC, wherein the second VNIC is located in the Media Access Control (MAC) layer of the host;
  a second interface, operatively connected to the second VNIC;
  a second virtual machine, operatively connected to the second interface,
  wherein the first NIC is further configured to:
    receive a second packet for the second virtual machine,
    classify the second packet using the hardware classifier, and
    send the second packet to a second receive ring of the first plurality of receive rings based on the classification; and
  wherein the host is further configured to:
    obtain the second packet from the second receive ring of the first plurality of receive rings;
    send the second packet to the second VNIC;
    send the second packet from the second VNIC to the second interface; and
    send the second packet from the second interface to the second virtual machine.

* * * * *